(12) United States Patent
Labonte et al.

(10) Patent No.: US 10,708,197 B2
(45) Date of Patent: **\*Jul. 7, 2020**

(54) NETWORK DATA PROCESSOR HAVING PER-INPUT PORT VIRTUAL OUTPUT QUEUES

(71) Applicant: Arista Networks, Inc., Santa Clara, CA (US)

(72) Inventors: Francois Labonte, Menlo Park, CA (US); Aditya Vikram Daga, Bangalore (IN)

(73) Assignee: Arista Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/916,144

(22) Filed: Mar. 8, 2018

(65) Prior Publication Data

US 2018/0198736 A1 Jul. 12, 2018

Related U.S. Application Data

(63) Continuation of application No. 14/989,573, filed on Jan. 6, 2016, now Pat. No. 9,942,171.

(60) Provisional application No. 62/188,365, filed on Jul. 2, 2015.

(51) Int. Cl.
*H04L 12/931* (2013.01)
*H04L 12/935* (2013.01)
*H04L 12/863* (2013.01)

(52) U.S. Cl.
CPC ...... *H04L 49/3045* (2013.01); *H04L 47/6205* (2013.01); *H04L 47/6225* (2013.01); *H04L 49/3027* (2013.01); *H04L 49/508* (2013.01)

(58) Field of Classification Search
CPC ............ H04L 49/3045; H04L 47/6225; H04L 49/508; H04L 47/6205; H04L 49/3027
See application file for complete search history.

(56) References Cited

U.S. PATENT DOCUMENTS

| | | |
|---|---|---|
| 6,078,953 A | 6/2000 | Vaid |
| 7,222,147 B1 | 5/2007 | Black |
| 7,224,668 B1 | 5/2007 | Smethurst |
| 7,263,597 B2 | 8/2007 | Everdell |
| 7,315,897 B1 | 1/2008 | Hardee |
| 7,743,090 B1 | 6/2010 | Gibson et al. |

(Continued)

*Primary Examiner* — Thai Nguyen
(74) *Attorney, Agent, or Firm* — Haley Guiliano LLP

(57) ABSTRACT

Various embodiments of a virtual output queue system within a network element enables per-input port virtual output queues within a network data processor of the network element. In one embodiment, each port managed by a network data processor has an associated set of virtual output queues for each output port on the network data element. In one embodiment, network data processor hardware supports per-processor VOQs and per-input port VOQs are enabled in hardware for layer 3 forwarding by overloading layer 2 forwarding logic. In such embodiment, a mapping table is generated to enable virtual per-input port VOQs for layer 3 forwarding logic using layer 2 logic that is otherwise unused during layer 3 forwarding. In one embodiment, multiple traffic classes can be managed per-input port when using per-input port VOQs. In one embodiment, equal cost multi-path (ECMP) and link aggregation support is also enabled.

18 Claims, 8 Drawing Sheets

(56) References Cited

U.S. PATENT DOCUMENTS

| | | |
|---|---|---|
| 7,768,919 B1 | 8/2010 | Conway |
| 8,223,642 B2 | 7/2012 | Curry |
| 8,797,877 B1 | 8/2014 | Perla |
| 8,806,058 B1 | 8/2014 | Mackie et al. |
| 2002/0165961 A1 | 11/2002 | Everdell |
| 2003/0088671 A1 | 5/2003 | Klinker et al. |
| 2003/0123394 A1 | 7/2003 | Neale et al. |
| 2005/0083927 A1 | 4/2005 | Lien et al. |
| 2006/0120282 A1 | 6/2006 | Carlson et al. |
| 2007/0165622 A1 | 7/2007 | O'Rourke |
| 2007/0201357 A1 | 8/2007 | Smethurst |
| 2007/0251077 A1 | 11/2007 | Wu |
| 2008/0016198 A1 | 1/2008 | Johnston-Watt |
| 2008/0056130 A1 | 3/2008 | Desai |
| 2008/0195750 A1 | 8/2008 | Sadovsky et al. |
| 2009/0144442 A1 | 6/2009 | Zheng |
| 2010/0316012 A1 | 12/2010 | Stanwood et al. |
| 2011/0235509 A1* | 9/2011 | Szymanski ............ H04L 47/14 370/230 |
| 2012/0163175 A1 | 6/2012 | Gupta |
| 2013/0080619 A1 | 3/2013 | Assuncao et al. |
| 2013/0250763 A1 | 9/2013 | Assarpour |
| 2014/0119193 A1* | 5/2014 | Anand ................... H04L 45/28 370/237 |
| 2016/0099857 A1 | 4/2016 | Begwani |

\* cited by examiner

NETWORK DATA PROCESSOR HAVING PER-INPUT PORT VIRTUAL OUTPUT QUEUES

CROSS-REFERENCE

Applicant claims the benefit of priority of prior, co-pending non-provisional application Ser. No. 14/989,573 filed Jan. 6, 2016; which claims the benefit of priority of provisional application Ser. No. 62/188,365, filed on Jul. 2, 2015, which is hereby incorporated by reference.

FIELD OF INVENTION

This invention relates generally to data networking and more particularly to per-input port virtual output queuing in a network data processor.

BACKGROUND OF THE INVENTION

A network element (such as a router or switch) transmits and receives network data using one or more ports of that network element. Each port on the network element has a physical link speed that limits the rate at which network data can be transmitted from that port. The network element uses one or more queues to store the network data that is to be transmitted from one of the ports of the network element. The maximum data that a queue stores is determined by the available buffer memory and a buffer configuration for the queue.

When the amount of network data that is to be transmitted by one of the ports on a network element, or the overall data transmitted by a network element, is greater than the port or network element can handle within a given period, network congestion can occur, resulting in increased latency for network data propagation through the nodes on the network. Network congestion, as well as output port contention, can cause a secondary performance limiting effect known as head of line blocking.

Head of line blocking within a store-and-forward network element results when network data units (e.g., packets, frames, etc.) in a first-in first-out (FIFO) buffer on an input port of the network element are held up by the first packet in the buffer, for example, due to output buffer congestion or output port contention. This is particularly true if the blocked network data units are meant to go to an uncongested port and are blocked by packets going to a congested port. Under some circumstances, head of line blocking can significantly reduce network element throughput under heavy network traffic conditions.

SUMMARY OF THE DESCRIPTION

Described herein are various embodiments of a virtual output queue (VOQ) system that enables per-input port VOQs at an ingress network data processor of a network element. In one embodiment, the network element includes a first port to receive a unit of network data, a second port to transmit the unit of network data, and a data plane coupled to the first port and the second port. The data plane can be configured to forward the unit of network data to the second port via a data pipeline including a VOQ that is associated with each of the first port and the second port. In one embodiment, the data pipeline can be configured to buffer the unit of network data in a per-input port VOQ associated with the first port and the second port when each of the first and second port have a data rate exceeding a threshold. In one embodiment, the data pipeline is configured to buffer the unit of network data in a VOQ that is shared between multiple input ports when the first port and the second port have a data rate beneath the threshold. In one embodiment, the data plane can be further configured to forward the unit of network data based on a network layer address and the VOQ is defined at least in part by a virtual data-link layer identifier. In one embodiment, the data plane of the network element comprises a first forwarding engine that is coupled to the first port, where the first forwarding engine includes an ingress data pipeline to manage network data received from the first port.

In one embodiment, the ingress data pipeline includes logic to determine that the unit of network data is to be forwarded to the second port via a network layer address of the network data, determine the virtual data-link layer identifier associated with the first port, determine a port identifier associated with the second port, and insert the unit of network data into the VOQ defined at least in part by the virtual data-link layer identifier associated with the first port and the port identifier associated with the second port. In one embodiment, one or more VOQs are used for each traffic class of network data supported by the network element and the ingress data pipeline can be configured to buffer the unit of network data into a VOQ defined at least in part the traffic class of the unit of network data.

In one embodiment, the network element additionally includes a second forwarding engine that is coupled to the second port. The second forwarding engine can include an egress data pipeline to manage network data transmitted to the second port. In such embodiment, the ingress data pipeline of the first forwarding engine is configured to request a scheduling credit for the unit of network data from the egress pipeline to enable the ingress pipeline to transmit the unit of network data to the egress pipeline. In one embodiment, the egress data pipeline of the second forwarding engine is configured to grant scheduling credit based on a scheduler that schedules among the different traffic classes according to the egress shaping and scheduling configuration and among the VOQs at the same traffic class on the different ingress forwarding engines. The scheduler among different VOQs at the same traffic class on different forwarding engine can be implemented as a weighted round robin scheduler that can be weighted based the data rate of the first port, which can be between 40 and 100 gigabits per second (Gb/s).

For the various embodiments described, a network element includes any one or more of a router, switch, hub, bridge, gateway, or other infrastructure devices for a packet-forwarding network. Furthermore, a network element can be a physical or virtual device. Additionally, the network data includes various types of packet forwarding network data including packets, datagrams, frames, or other data types used within a packet-switched network.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
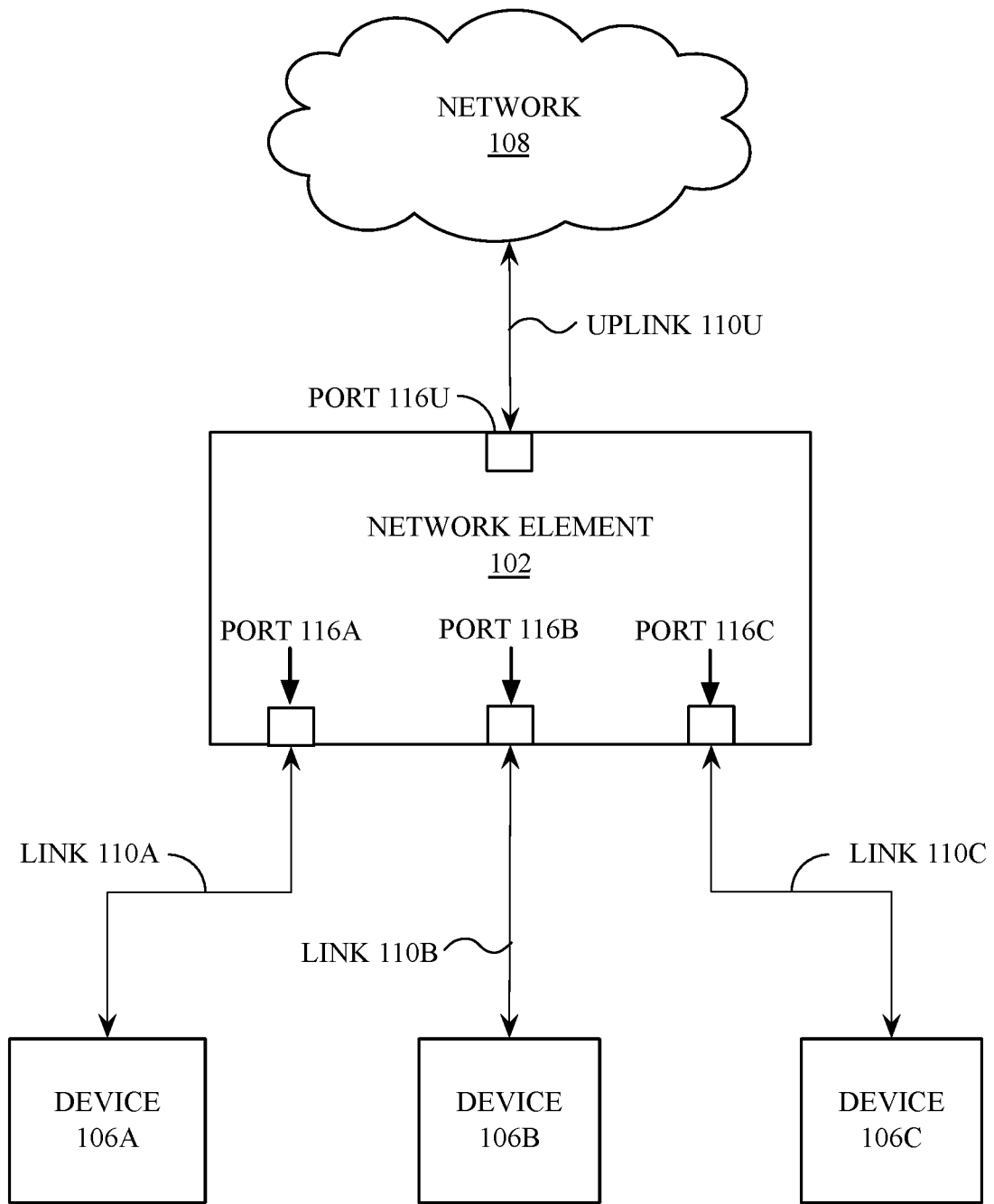
FIG. 1 is a block diagram of one embodiment of a system that includes a network element communicating network data between a network and a number of devices.

Virtual output queuing a mechanism that may be employed to prevent head of line blocking within network elements and, with an effective scheduling algorithm, can significantly increase network element throughput under heavy network data load. Instead of or in addition to a common per-port input queue for ingress network data, virtual output queues store ingress network data in separate virtual output queues (VOQs) associated with each output port before forwarding the network data to the physical output port. The VOQs allow network data units destined for uncongested or uncontended output ports to be forwarded while network data destined for congested or contended ports is arbitrated using a scheduling algorithm.

In one implementation of a network element, multiple network data processors (e.g., fabric access processors) are used to manage ingress and egress of network data units from port groupings of the network element. The network data processors may be configured to handle the ingress of network data into the network element or the egress of data out of the network element, where each ingress network data processor can include a VOQ for each egress port in the whole system. The VOQs on each ingress network data processor are arbitrated by the network data processor managing the egress of network data from the network element. In one implementation, the arbitration is performed via a credit request/grant loop. Network data units are queued in physical memory buffers on or associated with an ingress network data processor within a set of VOQs until an egress scheduler issues a credit grant for a given unit of network data. Once a credit is granted, the ingress network data processor may then forward the network data unit to the egress network data processor that manages the network data unit's destination port. In one such implementation, if a given output port is oversubscribed, then credit is granted equally across the VOQs of each ingress network processor with a non-empty queue.

The implementation described arbitrates between VOQs on a per-ingress network data processor basis. Accordingly, it is possible for an unfair amount of network bandwidth to be allocated between ingress network data processors when the number of active ports on each network data processor is unevenly distributed. For example, for an ingress network data processor managing two ports, if both ports attempt to send traffic to the same output port, the ingress network data processor places network data from both ports into the same VOQ. If there is another port sending on another ingress processor, the egress processor seeing two VOQs active in the system might grant credits fairly among the differing ingress processors. However, from the perspective of the ingress ports, ports on the same ingress processor only receive 25% of the bandwidth while a port by itself on an ingress processor will receive 50% of the bandwidth.

Described herein are various embodiments of a VOQ system that enables per-input port VOQs at an ingress network data processor of a network element. In one embodiment, each port managed by an ingress network data processor has an associated set of VOQs for each output port and traffic class on the network data element. In one embodiment, per-input port VOQs are limited to higher bandwidth ports on a network element, while lower bandwidth ports use per-ingress network data processor VOQs. For example, per-input port VOQs may be used for 40 Gb/s ports and/or 100 Gb/s ports, while standard VOQs may be used for 10 Gb/s ports and lower. In one embodiment, network data processor hardware supports per-processor VOQs and per-input port VOQs are enabled in hardware for layer 3 forwarding by overloading layer 2 forwarding logic. In such embodiment, a mapping table is generated to enable virtual per-input port VOQs for layer 3 forwarding logic using layer 2 data and logic that is otherwise ignored and unused during layer 3 forwarding. In one embodiment, multiple traffic classes can be managed per-input port when using per-input port VOQs. In one embodiment, equal cost multi-path (ECMP) and link aggregation support is also enabled.

Once placed into the per-input port VOQs, egress credits can be granted on a per-input port basis using a scheduling algorithm that accounts for the bandwidth of each port by using, for example, a weighted round robing scheduler. The VOQ for each input port can be configured to receive a fair number of egress credits, and the weights used by the credit scheduler for a VOQ can be adjusted based on the configured bandwidth of the port (e.g., 100 Gb/s ports may receive 2.5× more credit than 40 Gb/s ports).

To provide a thorough explanation of the various embodiments, numerous specific details are set forth herein. However, one having ordinary skill in the art will understand that embodiments may be practiced without these specific details. In some instances well-known components, structures, and techniques are not shown in detail to avoid obscuring key details within this description. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Network System and Network Elements

The processes depicted in the figures that follow, are performed by processing logic that comprises hardware (e.g., circuitry, dedicated logic, etc.), software (such as is run on a general-purpose computer system or a dedicated or specialized machine), or a combination of both. Although some of the processes are described below in terms of sequential operations, it should be appreciated that some of the operations described may be performed in a different order. Moreover, some operations may be performed in parallel rather than sequentially.

FIG. 1 is a block diagram of one embodiment of a network system 100 that includes a network element 102 communicating network data between a network 108 and a number of devices 106A-C. In various embodiments, the network element 102 is one or more of a switch, router, hub, bridge, gateway, etc., or any type of device that can provide access to a network 108 (e.g., physical network, virtualized network, etc.). In one embodiment, the network element 102 couples to the network 108 via an uplink 110U coupled to an uplink port 116U to provide network connectivity to devices 106A-C via respective links 110A-C coupled to ports 116A-C. The uplink port 116U and uplink 110U are generally configured for a high-speed wired connection (e.g., copper, fiber, etc.) that, in one embodiment, provides increased throughput capability relative to ports 116A-C and links 110A-C. The respective links 110A-C between the network element 102 and the devices 106A-C may also be wired connections. However, in some embodiments links 110A-C are created over alternate connection types such as wireless connections or a combination of wired and wireless connections.

In one embodiment, the device 106A-C is any type of device that can communicate network data with another device, such as a personal computer, laptop, or server. The devices 106A-C can also be a mobile device (e.g., phone, smartphone, personal gaming device, etc.), or another network element. In one embodiment, the devices 106A-C can each be a virtual machine or can be a device that hosts one or more virtual machines.

In various embodiments, different types of protocols can be used to communicate network data over the connection (e.g., Ethernet, wireless, Synchronous Optical Networking (SONET), Fiber channel, Infiniband, etc.). The network data being communicated by the network element 102 can be a stream of network frames, datagrams or data packets, or other types of discretely switched network data. In one embodiment, the network element 102 communicates network data between the devices 106A-C and the network 108 or between devices 106A-C using a variety of communicating techniques (e.g., layer 2 switching, layer 3 routing, traffic shaping, applying a quality of service (QoS) policy, etc.).

In one embodiment, the network element 102 is part of a region within a larger network topology, where the devices 106A-C are grouped within a separate network region as other devices coupled to the network 108. Network regions can be configured to allow the grouping of network endpoints, such as specific network stations, devices, trunks, media gateways, or protocol groups such as Internet Protocol groups within an enterprise network. Such regions may be defined physically, or can be defined virtually, via virtual networks that enable a virtual topology that differs from the physical topology of the network. Additionally, regions can be configured to have different parameters for processing and forwarding network data, such as differing audio parameters for a voice over IP network (VoIP), differing Quality of Service Parameters, or differing bandwidth limitations.

As described above, each of links 110A-C and uplink 110U have an associated physical link speed, where each physical link speed represents a maximum throughput for that link. The physical link speed for each link is generally deterministic and is based upon the physics of the physical medium and the length of the link. In one embodiment, variability in latency generally occurs in a network element due to the processing time involved in buffering, queuing, processing and forwarding network data from a source port to a destination port in that network element.

Figure 2:
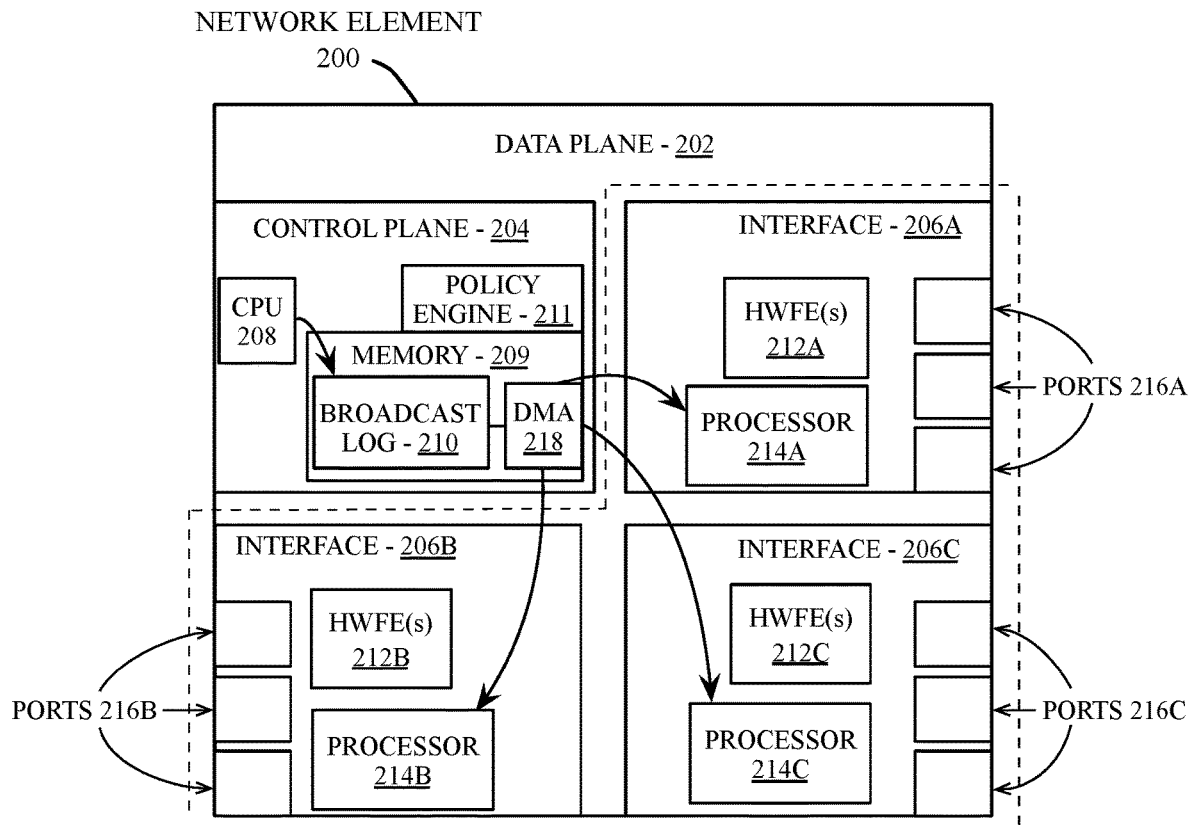
FIG. 2 is a block diagram of one embodiment of a network element including a data plane coupled to a control plane and several interface devices.

FIG. 2 is a block diagram of one embodiment of a network element 200 that includes a data plane 202 coupled to a control plane 204 and several interface devices 206A-C. In some network elements, the data plane 202 is referred to as the forwarding plane. In one embodiment, the illustrated network element 200 is a variant of the network element 102 of FIG. 1. In one embodiment, the control plane 204 includes central processing unit (CPU) 208 and memory 209 to store data. The CPU 208 is used to process information for the control plane 204 and writes configuration data for hardware forwarding engines 212A-C in the network interface devices 206A-C. Additionally, the CPU 208 can read data from the hardware forwarding engines 212A-C using the broadcast log 210. In one embodiment, the data plane 202 receives, processes, and forwards network data using various configuration data (e.g., forwarding, security, quality of service (QoS), and other network traffic processing information). The data plane 202 includes multiple network interface devices 206A-C (e.g., switches, routers, etc.) that can each receive, process, and/or forward network traffic. Each of the interface devices 206A-C include multiple ports 216A-C that are used to receive and transmit network data.

In one embodiment, for each received unit of network data, the data plane 202 determines a destination address for the network data, looks up the requisite information for that destination in one or more tables stored in the data plane, and forwards the data out the proper outgoing interface, for example, one of the interface devices 206A-C. In one embodiment, each interface device 206A-C includes one or more hardware forwarding engines (HWFE(s)) 212A-C, processor 214A-C, and ports 216A-C, respectively. Each hardware forwarding engine 212A-C forwards data for the network element 200, such as performing routing, switching, or other types of network forwarding. Each processor 214A-C can be used to accelerate various functions of the interface devices 206A-C. For example and in one embodiment, the processors 214A-C can read and write from a broadcast log 210 in the control plane 204 to program the corresponding hardware forwarding engines 212A-C. The processors 214A-C can also push data from the hardware forwarding engines 212A-C to a CPU 208 in the control plane 204 via the broadcast log 210.

In one embodiment, the control plane 204 gathers the configuration data for the hardware forwarding engines 212A-C from different sources (e.g., locally stored configuration data, via a command line interface, or other management channel (e.g., SNMP (Simple Network Management Protocol), Simple Object Access Protocol (SOAP), Representational State Transfer type Application Programming Interface (RESTful API), Hypertext Transfer Protocol (HTTP), HTTP over Secure Sockets layer (HTTPs), Network Configuration Protocol (NetConf), Secure Shell (SSH), and/or another management protocol) and pushes this configuration data to the hardware forwarding engines 212A-C using the broadcast log 210.

In one embodiment, the memory 209 that is used to store data for the control plane 204 is shared with the data plane 202. In such embodiment a direct memory access (DMA) controller 218 is coupled to the memory 209 to allow processors 214A-C direct access to the memory 209. In one embodiment, the DMA controller 218 allows the processors 214A to directly access the broadcast log 210 without requiring the CPU 208 in the control plane 204 to send data to each processor 214A-C. In one embodiment, the control plane 204 includes a policy engine 211 to apply a QoS policy to network traffic flowing through the network element 200. The policy engine 211 can be configured to minimize the latency of some type of network traffic, or to apply traffic shaping policies on the overall flow of traffic through the network element, or within a larger network topology. Proper determination of real-time latency data within the network can be key to the implementation of effective QoS policy. In one embodiment, logic to perform the timing of network data flow is consolidated into the hardware of the data plane 202 of each network element 200.

Forwarding Engine Pipeline

Figure 3:
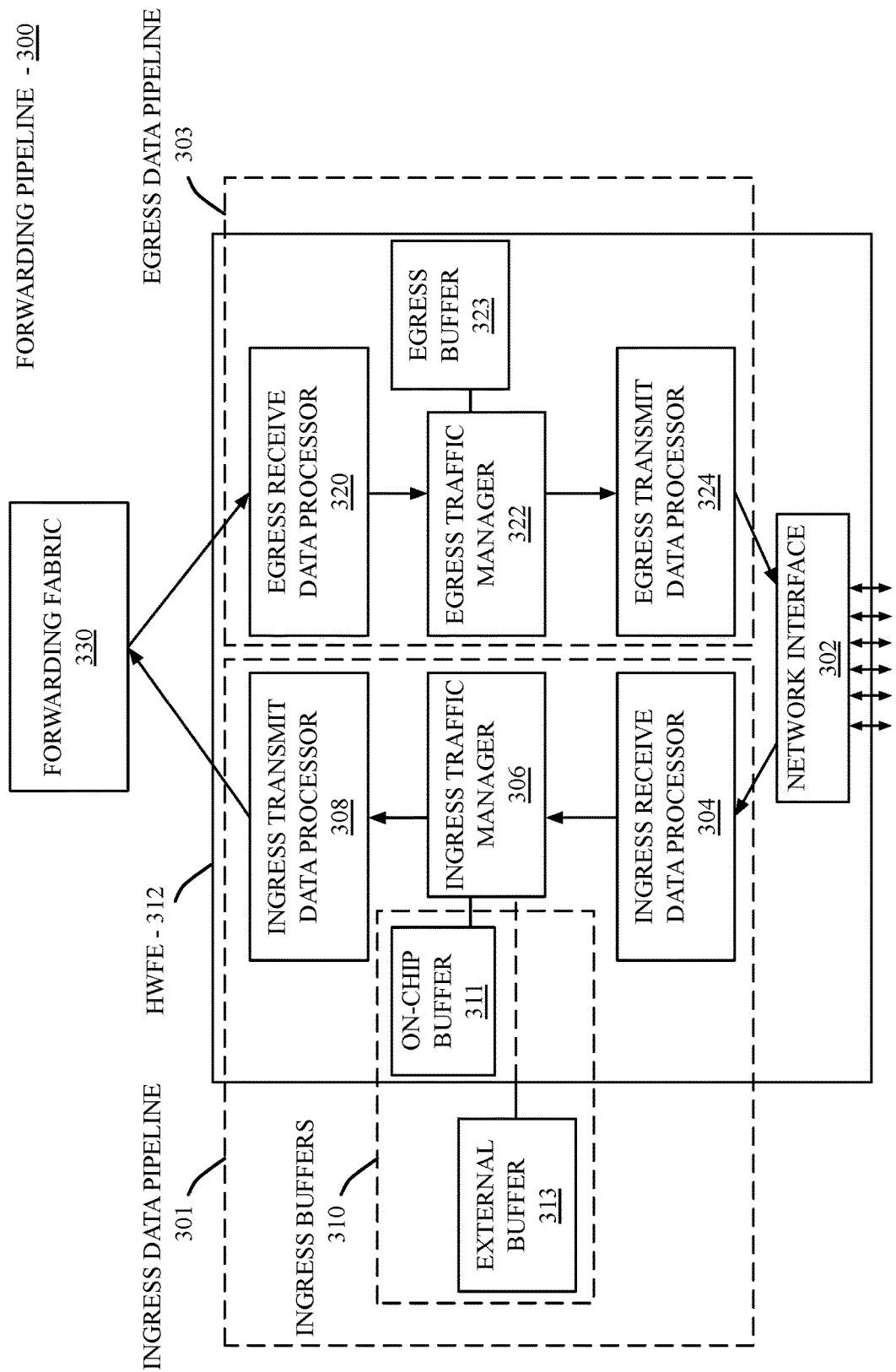
FIG. 3 is a block diagram of a forwarding pipeline within one embodiment of a network element.

FIG. 3 is a block diagram of a forwarding pipeline 300 within one embodiment of a network element. In one embodiment, the forwarding pipeline 300 resides in a hardware forwarding engine (e.g., HWFE 312), which includes logic from one or more of the HWFE(s) 212 within each interface 206 shown in FIG. 2. In one embodiment, within the HWFE 312 resides an ingress data pipeline 301 including a network interface 302, an ingress receive data processor 304, an ingress traffic manager 306, and/or an ingress transmit data processor 308. The ingress data pipeline 301 can include ingress buffers 310, which in one embodiment include an on-chip buffer 311 that resides in on-chip memory of the HWFE 312. Additionally, an external buffer 313 may also be included. The external buffer 313 can reside in an array of high speed, low latency random access memory (RAM) coupled to the HWFE 312 via a memory bus, which in one embodiment is a multi-channel memory bus.

In one embodiment, the ingress data pipeline 301 of the HWFE 312 works in concert with an egress data pipeline 303 residing within the HWFE 312. The egress data pipeline 303 can include an egress receive data processor 320, an egress traffic manager 322, on chip memory storing an egress buffer 323, and and/or an egress transmit data processor 324, which couples to the network interface. In one embodiment, the ingress data pipeline 301 and the egress data pipeline 303 each couple with a forwarding fabric 330, which can include one or more crossbar switches that interconnect multiple interfaces (e.g., interface 206A-C as in FIG. 2).

In one embodiment, the network interface 302 includes a physical layer (e.g., layer 1) interface including one or more ports (e.g., ports 216 as in FIG. 2). The physical layer is responsible for transmission and reception of bit streams across physical connections including encoding, multiplexing, synchronization, clock recovery and serialization of the data on the wire for whatever speed or type of interface is configured. In one embodiment, the network interface 302 supports combinations of 100 gigabits per second, 40 gigabits per second, and/or 10 gigabits per second ports, and ports may be combined into link aggregation groups using, for example, static link aggregation or link aggregation control protocol (LACP). In one embodiment, optical (e.g., fiber optic) and electrical (e.g., copper) connections are supported.

In one embodiment, the network interface 302 additionally includes data-link layer (e.g., layer 2) logic including media access control (MAC) and/or logical link control (LLC) logic. When a valid data stream is received at the physical layer, the data can be passed on to the MAC portion of the data link layer. In one embodiment, the physical and data-link layer logic is in compliance with the IEEE 802.3 Ethernet standard, although other technologies may be supported. In embodiments supporting the Ethernet standard, the MAC portion may divide the incoming data stream into Ethernet frames, although the techniques described herein may apply to equivalent network data units of other protocols and standards.

While the forwarding pipeline 300 is illustrating with specific individual logic elements within the ingress data pipeline 301 and egress data pipeline 303 of the HWFE 312, one having ordinary skill in the art will recognize that equivalent functionality may generally be performed by other logic elements within the forwarding pipeline 300 for network data within a hardware forwarding engine of a network element.

Ingress Data Processing

The network interface 302 can couple with the ingress receive data processor 304, which includes forwarding logic for incoming network data. In one embodiment, the ingress receive data processor 304 logic is flexible and can be configured to support new protocols and forwarding methods as they become available. The ingress receive data processor 304, in one embodiment, can parse the headers of incoming network data units and extract fields used to make forwarding decisions, such as data-link layer source and destination addresses (e.g., MAC addresses), virtual local area network (VLAN) headers, or network layer (e.g., layer 3) source and destination addresses and/or port numbers. In one embodiment, the ingress receive data processor 304 can perform forwarding at the data-link layer or network layer based on address information in the network data unit headers.

For example, a network data unit having a destination MAC address corresponding to the MAC address of the ingress network interface (e.g., network interface 302) may be forwarded using the network layer header address information for the layer 3 protocol (e.g., Internet Protocol, etc.) in use by the network data. Otherwise, a network data unit having a destination MAC address that differs from the address of the ingress network interface may be forwarded to an egress port associated with the indicated destination MAC address. For data-link layer forwarding, the destination MAC address for a given ingress unit of network data can be referenced against a lookup table that is populated with MAC addresses discovered or configured within the data-link layer sub-network of the ingress network data. The unit of network data may then be forwarded to the port associated with the indicated destination MAC address. If the destination MAC address lookup fails, the unit of network data may be flooded to all ports within the indicated data-link layer sub-network.

In one embodiment, the forwarding logic within the ingress receive data processor 304 may also perform a table lookup based on the source data-link layer or network-layer address. For example, the forwarding logic can add an entry for the source MAC address of a unit of network data receive from the network interface 302 if the source MAC address does not exist in the forwarding table. Where unicast reverse path forwarding (uRPF) is enabled for the network layer forwarding logic, a lookup can be performed to determine if the unit of network data has network layer source address information that is known to be valid for the ingress interface. In the case of invalid source address information, the unit of network data may be dropped, for example, to mitigate address spoofing that is commonly used in denial of service attacks on a network.

In one embodiment, VLANs are supported when performing data-link layer forwarding. When VLANs are in use, data-link layer domains may be partitioned to create multiple distinct broadcast domains that mutually isolated. In one embodiment, network data units associated with a specific VLAN can be tagged such that multiple devices may operate within the same virtual sub-network broadcast domain even though those devices are physically connected to different sub-networks. Alternatively, multiple virtual private LANs may be configured to operate on the same physical data-link layer, such that broadcast traffic is isolated within each virtual private LAN. For VLAN data-link layer forwarding, the destination MAC address for a given ingress unit of network data can be referenced against a lookup table that is populated with MAC addresses discovered or configured within the indicated VLAN of the ingress network data. Should the lookup fail, the network data may be flooded to all ports within the VLAN, subject to any storm-control thresholds that may be configured in some embodiments.

In one embodiment, network layer forwarding is performed in a similar manner as data-link layer forwarding, and may be performed using at least one common lookup table, excepting that network layer address data, rather than data-link address data, is used to make forwarding decisions. In one embodiment, for network layer and data-link layer forwarding, multiple different types of lookup tables can be used, with a best match from the combined lookups providing the forwarding result. In one embodiment, equal cost multi-path (ECMP) for network layer forwarding and/or link aggregation data-link layer forwarding is supported. When ECMP or link aggregation is in use, the forwarding determination may resolve to group of ports, providing multiple next-hop entries to choose from. In such embodiment, load-balancing logic may be performed to determine the destination port in the group to forward the network data unit. While logic for unicast forwarding is described above, in one embodiment, multicast forwarding can be performed in a similar manner as when performing ECMP or link aggregation, excepting that the data unit is broadcast to multiple ports in a group of ports. In one embodiment, this may be performed by having the forwarding destination resolve to a multicast ID that provides an index into a table that indicates the output interfaces for a given multicast stream.

In one embodiment the HWFE 312 supports virtual routing and forwarding (VRF). In such embodiment, a VRF instance can be applied to internal data processing headers. When using VRF, multiple instances of a network-layer forwarding table (e.g., routing table) can co-exist within the same network-element to create multiple virtual network-layer forwarding instances. For example, the same or overlapping network layer addresses can be used within the same network element if the conflicting or overlapping addresses are used in separate VRF instances, allowing network paths to be segmented without the use of multiple devices.

Ingress Data Queuing and Scheduling

In one embodiment, the ingress data pipeline 301 includes logic for an ingress traffic manager 306 that is responsible for packet queuing and scheduling after data-link layer or network layer forwarding decisions have been made. The ingress traffic manager 306 can queue incoming units of network data within VOQs stored in ingress buffers 310. In one embodiment the ingress buffers include an on chip buffer 311 stored in on-die or on-package memory of the HWFE, as well as at least one external buffer 313 stored in external (e.g., chipset) memory that is coupled to the HWFE 312. In one embodiment, each HWFE 312 includes a VOQ for each output port in the system. In one embodiment, each HWFE 312 includes per-input port VOQs, where a VOQ is provided for each input-port/output-port combination in the system. In one embodiment, the VOQs may be split between the on-chip buffer 311 and the external buffer 313, where units that are to be forwarded to uncongested output ports can be stored in the on chip buffer 311, while units destined for congested ports can be stored in the external buffer 313. However, embodiments are not limited to this configuration, as VOQs may be stored entirely in the on-chip buffer 311 or entirely in the external buffer 313 depending on system configuration.

In one embodiment, when a forwarding decision is made for a unit of network data, the ingress traffic manager 306 determines an appropriate VOQ to buffer the unit of network data until logic in the appropriate egress data pipeline (e.g., egress data pipeline 303, or an egress data pipeline in a different hardware forwarding engine) is ready to receive the unit of network data. In one embodiment, the appropriate VOQ for the unit of network data can be determined at least in part based on the destination port to which the unit of network data is to be forwarded, as at least one VOQ exists for each egress port. Additionally, at least some network data is buffered in per-input port VOQs, where each ingress/egress port combination has a separate VOQ. The per-input port VOQs provide increased scheduling granularity over per forwarding engine VOQs In one embodiment, network data from an ingress port having a data rate in excess of a certain threshold is assigned to per-input port VOQs, while network data from an ingress port having a data rate below the threshold is assigned to a set of VOQs that store data for all below-threshold input ports. For example, and in one embodiment, a 40 gigabits per second (Gb/s) threshold is configured, such that network data from an ingress port having a data rate of at least 40 Gb/s is buffered in a per-input port VOQ, while network data from an ingress port having a lower data rate (e.g., 10 Gb/s) is buffered in a per-forwarding engine VOQ that is shared with other ports with data rates below the threshold. In one embodiment, network data is buffered in per-forwarding engine VOQs unless both the ingress port and the egress port have data rates above the threshold. While a 40 GB/s threshold is used in one embodiment, the threshold may be adjusted and may vary between embodiments and implementations.

In some embodiments the HWFE 312 supports multiple traffic classes for use in implementing Quality of Service (QoS) policies, or other policy based forwarding techniques. In one embodiment, up to 8 distinct traffic classes may be configured and separate VOQs are provided for each traffic class. Per traffic class VOQs may be implemented for both per-input port VOQs as well as per forwarding engine VOQs, such that the number of traffic classes multiplies the total number of VOQs. For example and in one embodiment, the number of per-input port VOQs per HWFE 312 is defined by the number of input ports on the forwarding engine having per-input port VOQs multiplied times the total number of enabled output ports on the system, which in turn is multiplied times the number of traffic classes per port. The number of VOQs available to service input ports below the input-port VOQ threshold is defined for each forwarding engine, in one embodiment, as the total number of enabled output ports on the system multiplied times the total number of traffic classes per port, as units of network data that ingress on each input port having a data rate below the per-input port VOQ threshold may be buffered in a set of per-forwarding engine VOQs.

In one embodiment, once the unit of network data is buffered in a VOQ, the ingress data pipeline 301, for example, via the ingress traffic manager 306, can request a scheduling credit from the forwarding engine that manages the destination port for the unit of network data. Once a scheduling credit is granted, the ingress data pipeline, for example, via an ingress transmit data processor 308, can forward the unit of network data across a forwarding fabric 330 to the destination forwarding engine. In one embodiment, the forwarding fabric 330 is a distributed forwarding fabric having multiple available paths between each of the forwarding engines. In such embodiment, the ingress transmit data processor 308 can subdivide the data unit into variable sized cells and transmit the cells across all available crossbar elements within the forwarding fabric 330. For network data units having an ingress port and an egress port on the same forwarding engine (e.g., HWFE 312), the unit of network data may be locally switched to the egress data pipeline 303 without transmitting data via the forwarding fabric 330.

Egress Data Processing

In one embodiment, the egress data pipeline 303 of the HWFE 312 processes units of network data after the network data is forwarded. In one embodiment, locally forwarded network data, as well as network data received via the forwarding fabric 330 is processed by the egress receive data processor 320, which re-assembles network data that is sliced by the ingress transmit data processor 308 with in the ingress data pipeline 301 of the ingress forwarding engine.

In one embodiment, the egress traffic manager 322 is responsible for granting VOQ scheduling credits to ingress traffic managers (e.g., ingress traffic manager 306). The egress traffic manager 322 can immediately grant scheduling requests made for uncongested output ports (e.g., output ports having empty or nearly empty queues in the egress buffer 323) and can grant credits for congested ports using, for example, within a traffic class, using a weighted round robin scheduler that grants fair bandwidth to each requesting VOQ within the ingress data pipeline 301 of the requesting forwarding engine. In one embodiment, the scheduling algorithm is configured to grant requests between traffic classes using the configured egress shaping and scheduling for the port. In one embodiment, the scheduling algorithm is configured to grant requests within a traffic class for an output port among the different VOQs competing for credits based on a weighted round robin scheduler. The scheduling can be determined based on the data rate of the input port associated with the VOQ when the VOQ is a per-input port VOQ or for a per-forwarding engine VOQ according to the sum of the data rates of the ports below the per input port threshold. For example, a VOQ associated with a 100 Gb/s port may receive 2.5× more credit than a VOQ associated with a 40 Gb/s port and a VOQ associated with a forwarding engine with three 10 Gb/s ports when the per input port VOQ threshold is 40 Gb/s would receive 30% as many credits as the 100 Gb/s VOQ.

In one embodiment, the egress traffic manager 322 also manages egress buffering within the system via the egress buffer 323. In one embodiment, the egress buffer 323 is an on-chip buffer stored in on-die or on-package memory within the HWFE 312. In some configurations, the egress buffer 323 is primarily used for multicast traffic, as unicast traffic may be buffered primarily within the various VOQs.

In one embodiment, transmission of network data is managed via the egress transmit data processor 324, which can read buffered egress network data from the egress buffer 323 and transmit the network data via a port on the network interface 302.

Figure 4:
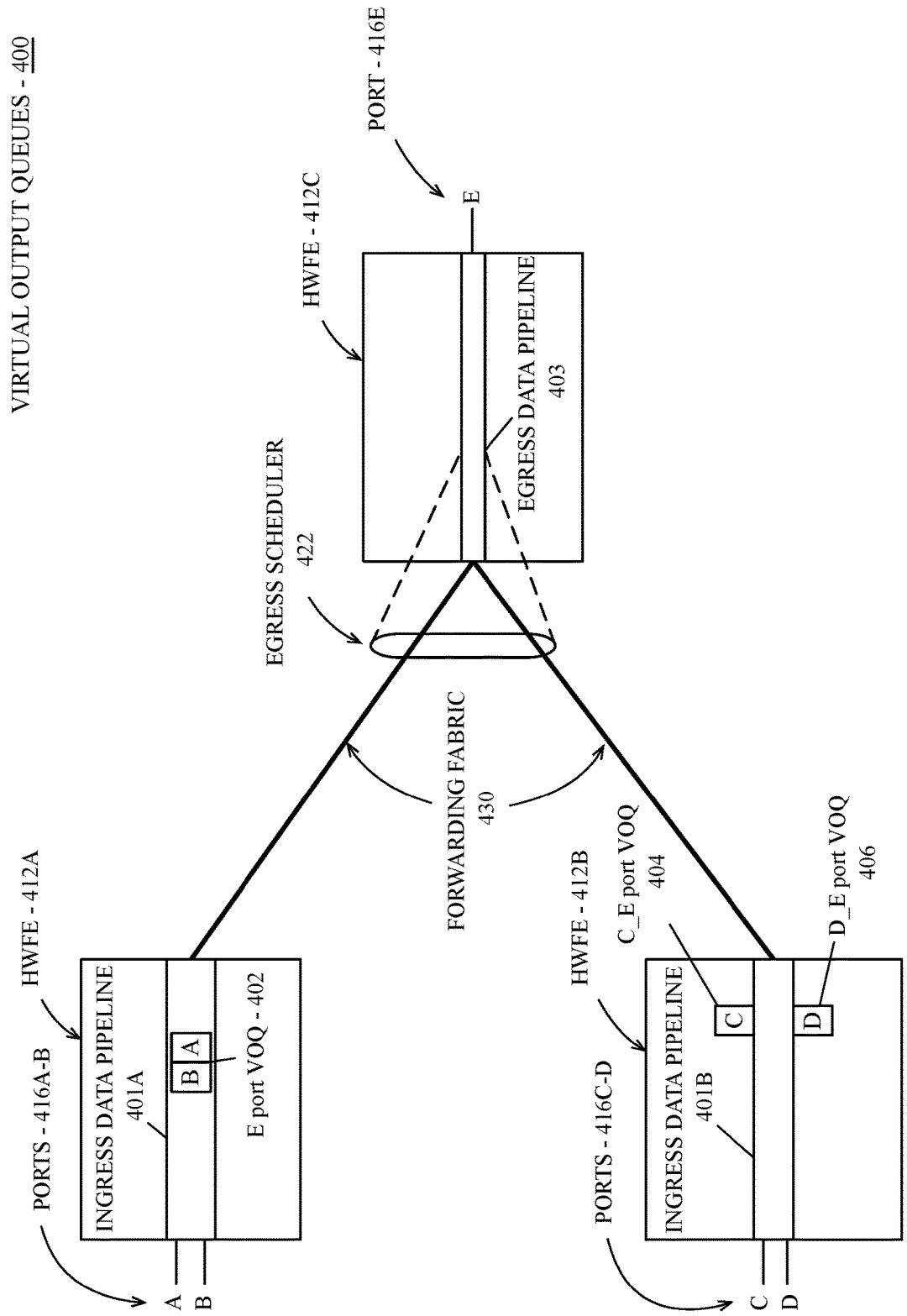
FIG. 4 is a block diagram of virtual output queues (VOQs) within a forwarding engine of a network element, according to an embodiment.

FIG. 4 is a block diagram of virtual output queues 400 within a forwarding engine of a network element, according to an embodiment. In one embodiment, virtual output queues (VOQs) reside within ingress data pipelines of each of HWFE 412A-C, although only ingress data pipelines 401A-B in HWFE 412A-B are shown. Likewise, egress data pipelines reside in each of HWFE 412A-C, although only the egress data pipeline 403 of HWFE 412C is shown. Each ingress data pipeline 401A-B includes VOQs 402, 404, 406 to store ingress data until, in one embodiment, an egress scheduler 422 grants a scheduler credit, which allows the ingress data pipelines 401A-B to transmit ingress data to the egress data pipeline (e.g., egress data pipeline 403) associated with the network data destination port (e.g., port 416E). Once a scheduler credit is granted, the ingress data pipelines 401A-B may transmit the ingress network data, which in the configuration illustrated in FIG. 4 is transmitted over a forwarding fabric 430.

Exemplary ports 416A-B of HWFE 412A represent ingress ports having a data rate below the per-input port VOQ threshold. While each potential egress port within the network element has at least one VOQ, when both of exemplary ports 416A-B have network data that is to be forwarded to the same destination port (e.g., port 416E of HWFE 412C), data from both of ports 416A-B may be buffered in the same VOQ (e.g., E port VOQ 402 for port 416E), particularly for data of the same traffic class. Accordingly, per-HWFE VOQs may, on occasion and under some circumstances, see up to a linear reduction bandwidth available to each port based on the number of ports on HWFE 412A that are in contention for the same output port, as the egress scheduler 422 may be configured to grant scheduling credits on a per VOQ basis. This provides fair bandwidth allocation for ports above the per input port VOQ speed threshold, while avoiding an explosion of the number of VOQs in the system and providing some aggregate fairness per HWFE for the ports below the per input port VOQ speed threshold.

In one embodiment, exemplary ports 416C-D of HWFE 412B represent ports having a data rate above the configured per-input port threshold, such that when ports 416C-D each include network data that is destined for port 416E, the network data from each of ports 416C-D are buffered in a VOQ for each respective input port (e.g., C_E port VOQ 404 for port 416C and D_E port VOQ 406 for port 416D). Accordingly, the egress scheduler 422 may fairly allocate scheduling credits between ingress data from each of ports 416C-D, as each unit of network data received via each ports 416C-D on HWFE 412B is buffered in a separate, per-input port VOQs for each output port. In one embodiment, such allocation may be performed via a weighted round-robin scheduler, which may weight requesting VOQs based on the data rate associated with each port and/or the traffic class of the network data buffered within the VOQ.

Per-Input VOQs Using Virtual Data-Link Layer Logic

Figure 5:
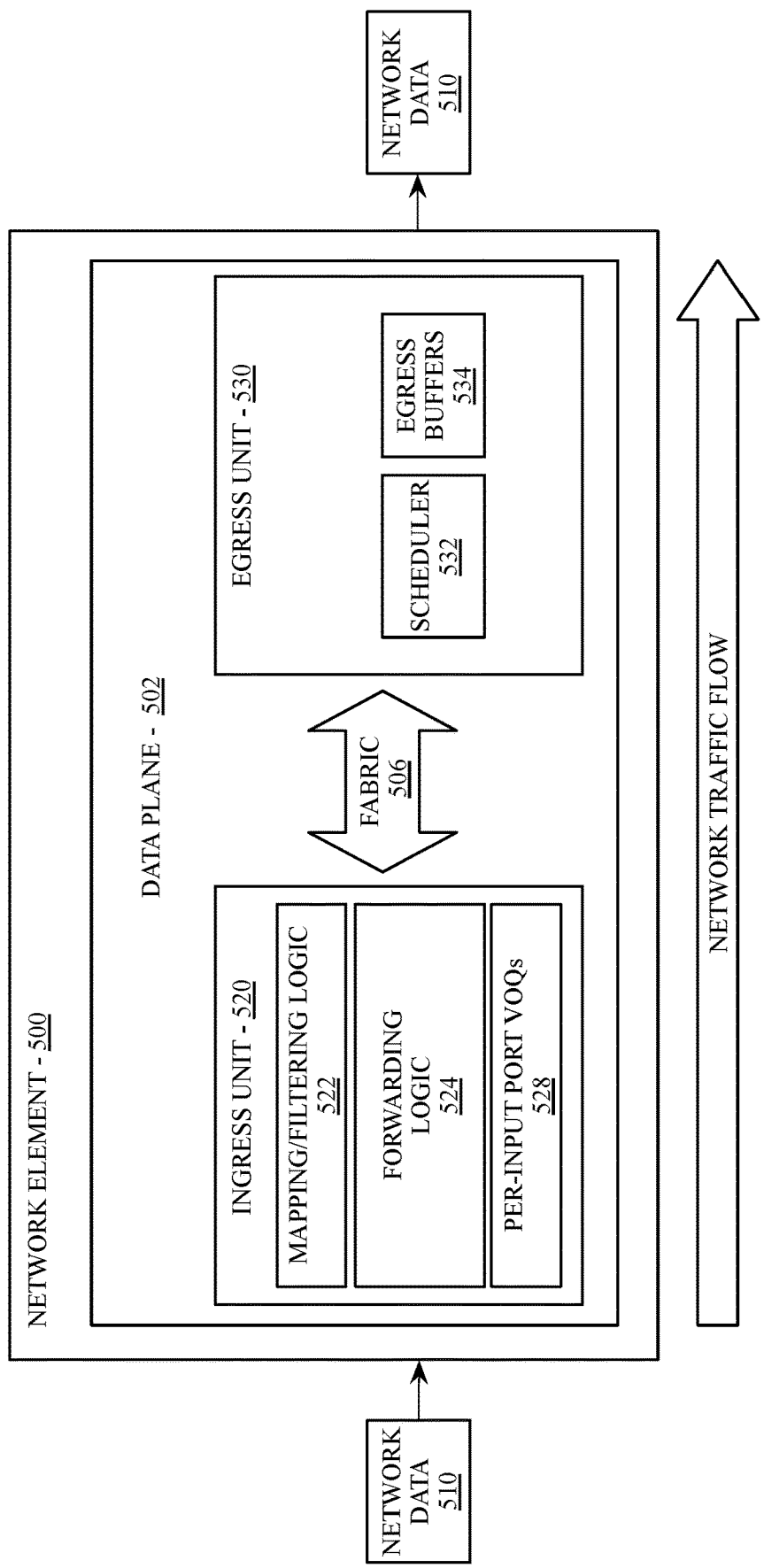
FIG. 5 illustrates logic within a network element to perform per-input port virtual output queuing for network data, according to an embodiment.

FIG. 5 illustrates logic within a network element 500 to perform per-input port virtual output queuing for network data forwarding. In one embodiment, the network element 500 includes a data plane 502 having an ingress unit 520 and an egress unit 530, which may include logic to perform equivalent operations as those illustrated and described with respect to the ingress data pipeline 301 and egress data pipeline 303 of FIG. 3. The ingress unit 520 includes various network interfaces and ports (not shown) to receive and process various data headers on units of incoming network data 510 before forwarding the network data 510 via forwarding logic 524. In one embodiment, after an output port is determined for forwarded network data 510, the data may be buffered in per-input port VOQs 528 before being forwarded to the egress unit (e.g., egress unit 530) associated with the destination port, for example, across a crossbar fabric 506. The exemplary egress unit 530 includes a scheduler 532 to grant scheduling credits to enables the ingress unit 520 to forward units of network data 510 to the egress unit 530. The units of network data 510 may be buffered in egress buffers 534 of the egress unit 530 before the network data 510 is transmitted via a destination port of the network element 500.

While embodiments of the ingress unit 520 may include support for per-input port VOQs 528, at least one embodiment of the ingress unit 520 can implement per-input port VOQs 528 on an ingress unit 520 having support for less than per-input port VOQs 528 (e.g., per-forwarding engine VOQs, etc.). In one such embodiment, per-input port VOQs are implemented for at least a portion of input ports (e.g., input ports above a data rate threshold). In one embodiment, per-input port VOQs are implemented for units of network data forwarded at the network layer (e.g., layer 3) by overloading portions of the forwarding logic 524 that are specific to data-link layer (e.g., layer 2) forwarding, to enable the ingress unit 520 to address sufficient VOQs to provide separate VOQs for multiple input ports.

Figure 6:
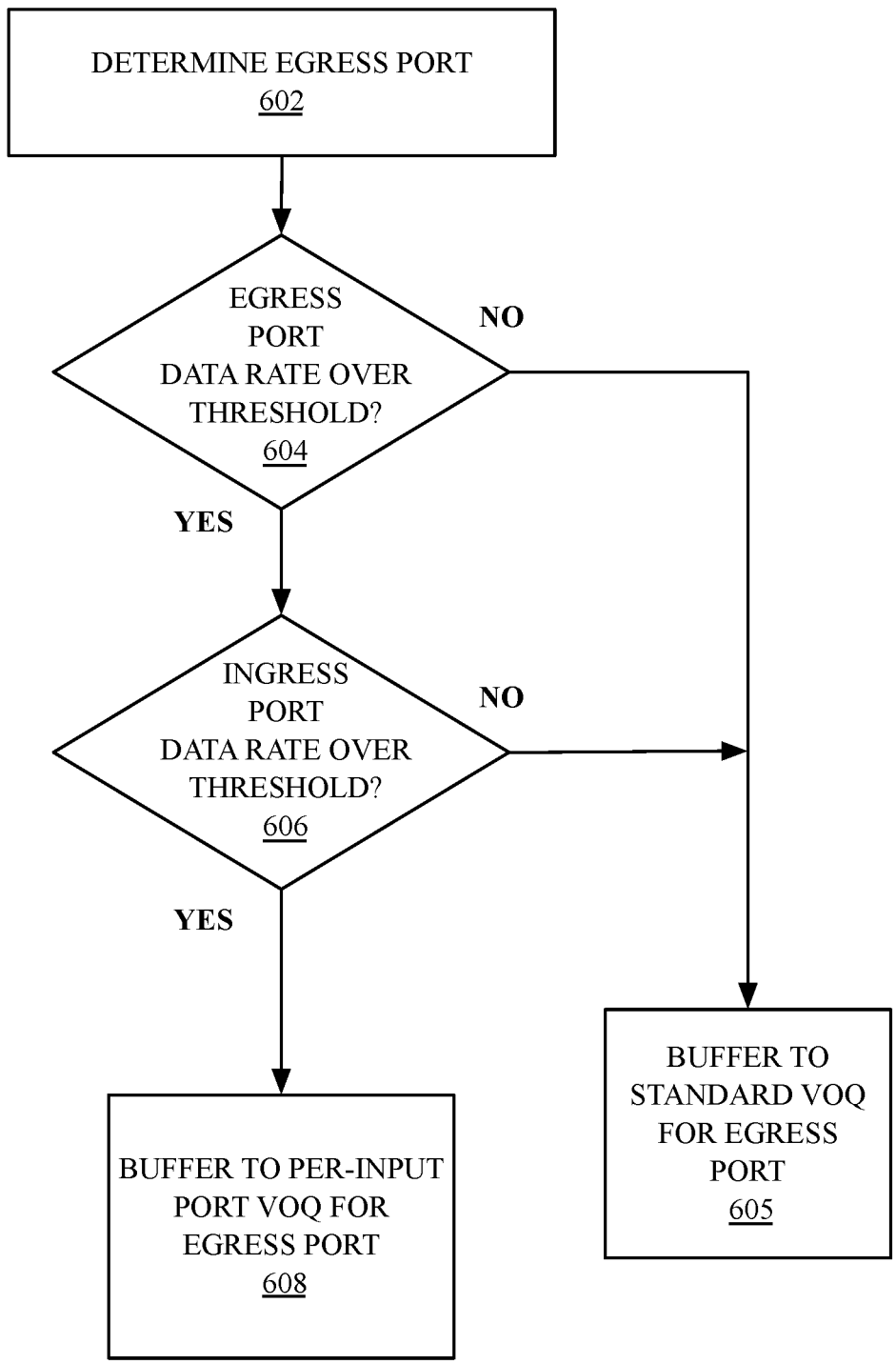
FIG. 6 is a flow diagram of forwarding logic utilizing per-input port VOQs for network data, according to an embodiment.

FIG. 6 is a flow diagram of forwarding logic 600 utilizing per-input port VOQs for network data, according to an embodiment. In one embodiment, the forwarding logic 600 resides in the forwarding logic 524 of FIG. 5, which includes, for example, the ingress receive data processor 304 logic of the ingress data pipeline 301 of each HWFE 312, as shown in FIG. 3. However, the specific location of the logic may vary, and other components of each forwarding engine may also be utilized (e.g., mapping/filtering logic 522 of FIG. 5).

In one embodiment, after the forwarding logic 600 determines an egress port for network data port at block 602, the logic can determine at block 604 whether the egress port has a data rate over a defined per-input port VOQ data rate threshold. In one embodiment, the per-input port VOQ data rate threshold is defined such that ports 40 Gb/s and over will be assigned per-input port VOQs, however the threshold may vary according to embodiments. If the egress port is not determined to be over the data rate threshold at block 604, at block 605 the forwarding logic can buffer the network data to a standard VOQ for the egress port. In one embodiment, the standard VOQ for the egress port is a VOQ that is shared between multiple input ports.

In one embodiment, the forwarding logic 600 can determine at block 606 whether the ingress port for the network data has a data rate over the per-input port VOQ threshold. If the egress port does not have a data rate over the threshold, the network data is buffered to the standard VOQ for the egress port at block 605, even if the egress port has a data rate over the threshold, as determined at block 604. In such embodiment, the per-input port VOQs are reserved for network data that is ingresses and egresses through the higher data-rate ports on the network element. If the egress port data rate is over the per-input port data rate threshold at block 604 and the ingress port data rate is also over the per-input port data rate threshold at block 606, then in one embodiment, the forwarding logic 600 can buffer network data to a per-input port VOQ for the egress port, as shown at block 608.

In one embodiment, additional VOQs may also be determined and mapped for each traffic class that is supported by the network element, such that buffering determinations can be made based on the traffic class of the network data. In one embodiment, per-traffic class VOQs are supported without regard to whether per-input port VOQs are in use.

Figure 7:
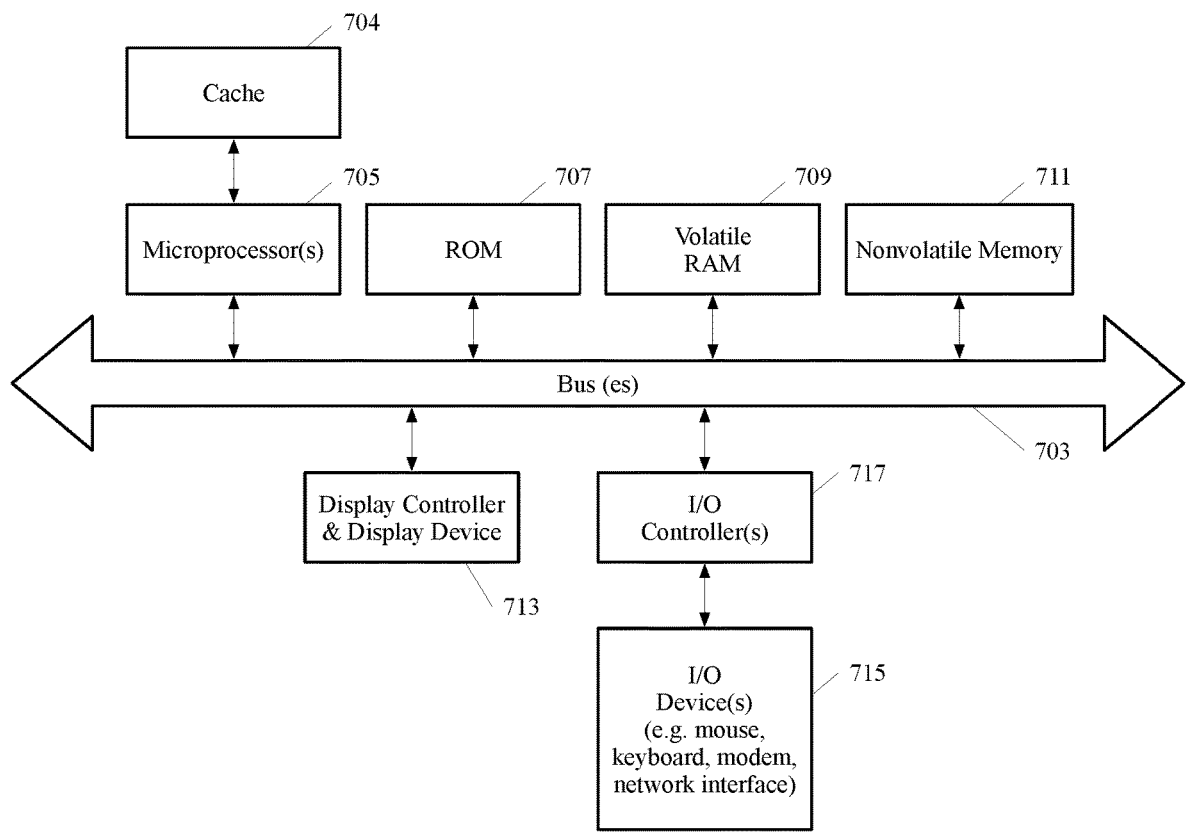
FIG. 7 shows one example of a data processing system, which may be used with one embodiment of the present invention.
Figure 8:
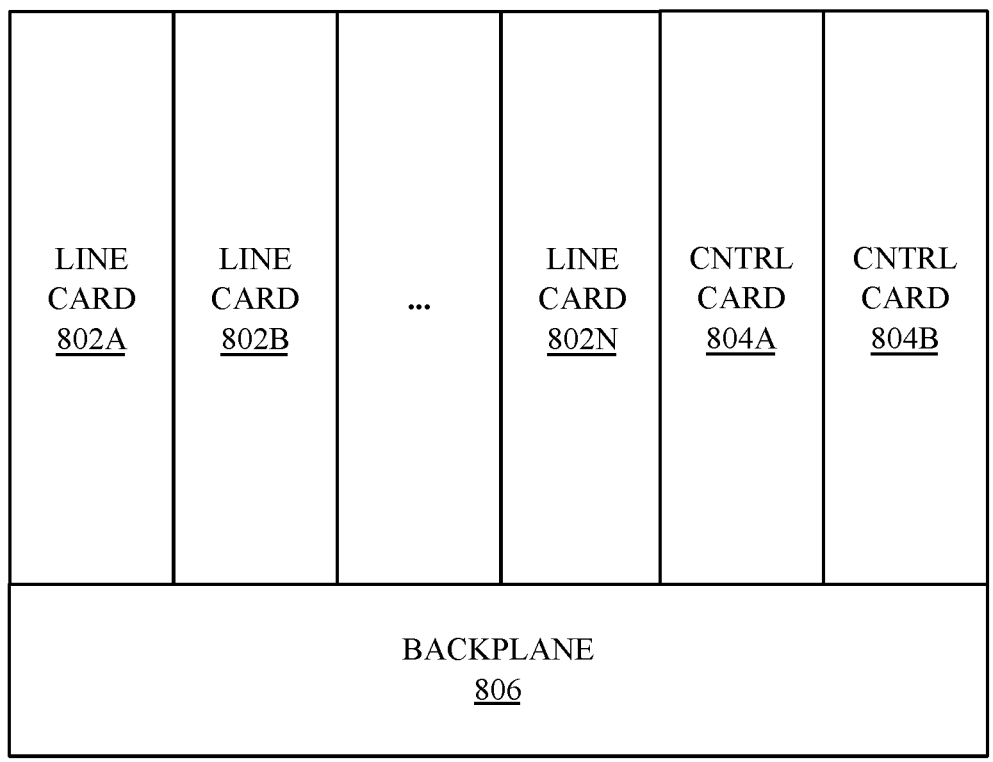
FIG. 8 is a block diagram of an additional embodiment of an exemplary network element as described herein.

FIG. 7 shows one example of a data processing system 700, which may be used with one embodiment of the present invention. For example, the data processing system 700 may be implemented including one or more of network element 102 as in FIG. 1 or network element 200 as in FIG. 2. Note that while FIG. 8 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

The data processing system 700 includes one or more bus(es) 703 which couple to one or more microprocessor(s) 805, ROM (Read Only Memory) 707, volatile RAM 709 and a non-volatile memory 711. In one embodiment, the one or more microprocessor(s) 705 couple to a cache 704, which can include one or more sets of instruction and/or data caches. The bus(es) 703 may include one or more buses connected to each other through various bridges, controllers and/or adapters as is well known in the art.

The microprocessor(s) 705 may retrieve the instructions from the memories 707, 709, 711 and execute the instructions to perform operations described above. During execution, instructions and/or associated data retrieved from the memories 707, 709, 711 may be stored in the cache 704. The bus(es) 703 interconnect system components with each other, and to a display controller and display device 713, and to peripheral devices such as input/output (I/O) devices, which may be mice, keyboards, modems, network interfaces, printers and other devices well known in the art. Typically, the input/output devices 715 are coupled to the system via input/output controller(s) 717. The volatile RAM (Random Access Memory) 709 is typically implemented as dynamic RAM (DRAM), which requires power continually in order to refresh or maintain the data in the memory, but may also include static ram (SRAM), which does not require a periodic refresh.

In one embodiment, the non-volatile memory 711 is used at least in part as mass storage, which typically includes one or more of a magnetic hard drive, a magnetic optical drive, an optical drive, flash memory, or other types of memory systems, which maintain data after power is removed from the system. Typically, the mass storage portion of the non-volatile memory 711 will also be a random access memory although this is not required. While FIG. 7 shows that the non-volatile memory 711 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine-readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

FIG. 8 is a block diagram of an additional embodiment of an exemplary modular network element 800 as described herein. In one embodiment, the network element has a modular and expandable configuration that allows the addition or removal of resources configured as line cards 802A-N, or controller cards 804A-B coupled to a backplane 806. In one embodiment, the controller cards 804A-B control the processing of the traffic by the line cards 802A-N, which can each include one or more network data forwarding devices such as interfaces 206A-C as in FIG. 2, although the precise nature of the forwarding devices is not limited as such. In addition, the controller card 804A-B can collect and possibly aggregate timing data as described in FIG. 7 above. In one embodiment, the line cards 802A-N process and forward traffic according to the network policies received from controller cards the 804A-B. In one embodiment, one or more of the line cards 802A-N can monitor and report internal performance data, such as latency data for all or selected units of network data traversing the network element. In one embodiment, the controller cards 804A-B can also be configured to perform all or a sub-set of functions provided by the line cards 802A-N. It should be understood that the architecture of the network element 800 illustrated in FIG. 8 is exemplary, and different combinations of cards may be used in other embodiments.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "measuring," "receiving," "determining," "transmitting," "sending," "forwarding," "detecting," "gathering," "dropping," "communicating," "canceling," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description above. In addition, software aspects of the various embodiments are not described with reference to any particular programming language. It will be appreciated that a variety of programming languages may be used to implement the teachings described herein.

In the description above and in the claims below, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Additionally, the terms "server," "client," and "device" are intended to refer generally to data processing systems rather than specifically to a particular form factor for the server, client, and/or device.

Specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Additionally various components described herein can be a means for performing the operations or functions described in accordance with an embodiment.

Described herein are various embodiments of a VOQ system that enables per-input port VOQs at an ingress network data processor of a network element. In one embodiment, the network element includes a first port to receive a unit of network data, a second port to transmit the unit of network data, and a data plane coupled to the first port and the second port. The data plane can be configured to forward the unit of network data to the second port via a data pipeline including a virtual output queue (VOQ) that is associated with each of the first port and the second port. In one embodiment, the data pipeline can be configured to buffer the unit of network data in a per-input port VOQ associated with the first port and the second port when each of the first and second port have a data rate exceeding a threshold. In one embodiment, the data pipeline is configured to buffer the unit of network data in a VOQ that is shared between multiple input ports when the first port and the second port have a data rate beneath the threshold. In one embodiment, the data plane can be further configured to forward the unit of network data based on a network layer address and the VOQ is defined at least in part by a virtual data-link layer identifier. In one embodiment the data plane of the network element comprises a first forwarding engine that is coupled to the first port, where the first forwarding engine includes an ingress data pipeline to manage network data received from the first port.

In one embodiment, the ingress data pipeline includes logic to determine that the unit of network data is to be forwarded to the second port via a network layer address of the network data, determine the virtual data-link layer identifier associated with the first port, determine a port identifier associated with the second port, and insert the unit of network data into the VOQ defined at least in part by the virtual data-link layer identifier associated with the first port and the port identifier associated with the second port. In one embodiment, one or more VOQs are used for each traffic class of network data supported by the network element and the ingress data pipeline can be configured to buffer the unit of network data into a VOQ defined at least in part the traffic class of the unit of network data.

In one embodiment, the network element additionally includes a second forwarding engine that is coupled to the second port. The second forwarding engine can include an egress data pipeline to manage network data transmitted to the second port. In such embodiment, the ingress data pipeline of the first forwarding engine is configured to request a scheduling credit for the unit of network data from the egress pipeline to enable the ingress pipeline to transmit the unit of network data to the egress pipeline. In one embodiment, the egress data pipeline of the second forwarding engine is configured to grant scheduling credit based on a scheduler that first schedules among the different traffic classes according to the egress shaping and scheduling configuration and then among the VOQs at the same traffic class on the different ingress forwarding engines. The scheduler among different VOQs at the same traffic class on different forwarding engine can be implemented as a weighted round robin scheduler that can be weighted based the data rate of the first port, which can be between 40 and 100 gigabits per second (Gb/s). In one embodiment, a 100 Gb/s port can be weighted at least twice as much as a 40 Gb/s port. In one embodiment, the ingress data pipeline is to forward the unit of network data to the egress data pipeline after the scheduling credit is granted by the egress data pipeline.

For the various embodiments described, a network element includes any one or more of a router, switch, hub, bridge, gateway, or other infrastructure devices for a packet-forwarding network. Furthermore, a network element can be a physical or virtual device. Additionally, the network data includes various types of packet forwarding network data including packets, datagrams, frames, or other data types used within a packet-switched network.

One embodiment provides a non-transitory machine-readable medium storing instructions which, when executed by one or more processing units of a network element, cause the one or more processing units to perform operations to forward a unit of network data, the operations comprising receiving network data at an ingress port of the network element, determining an egress port for the network data via a network layer data header, determining a port identifier associated with the egress port, and buffering the network data in a virtual output queue (VOQ) associated with each of the ingress port and the egress port, wherein the VOQ is determined at least in part based on the egress port and the ingress port.

In one embodiment, the medium provides instructions for operations comprising determining a first data rate for the ingress port, determining a second data rate for the egress port, and buffering the network data in the VOQ associated with each of the ingress port and the egress port when each of the first data rate and the second data rate exceed a threshold. In one embodiment, the medium provides instructions for operations comprising buffering the network data in a VOQ associated with each of the ingress port and the egress port when each of the first data rate and the second data rate exceed a threshold. In one embodiment, the medium provides instructions for operations comprising buffering the network data in a VOQ shared between multiple ingress ports when the ingress port and the egress port have a data rate beneath the threshold. In one embodiment, the threshold is 40 gigabits per second.

One embodiment provides for a system within a network element to forward network data, where the system comprises a first network data processor coupled to a first network interface, the first network data processor to forward network data received from the first network interface, the first network data processor further to receive a unit of network data from a first port at the first network interface, determine a second port to forward the unit of network data based on a network layer address of the unit of network data, determine an identifier associated with the second port, determine whether the first port and the second port have a data rate in excess of a threshold, and when the first port and the second port have a data rate in excess of the threshold, determine a virtual output queue (VOQ) associated with the combination of first and second port.

In one embodiment, the system further comprises a second network data processor coupled to a second network interface, the second network interface including the second port, wherein the second network data processor is to receive a request for a scheduling credit from the first network data processor and determine whether to grant the scheduling credit based on at least one of a status of an egress buffer associated with the second port and a weighted round robin scheduler, the weighted round robin scheduler weighted based on the data rate of the first port. In one embodiment the first port has a data rate of one of 40 gigabytes per second and 100 gigabytes per second and the weighted round robin scheduler grants at least twice as much weight to the first port when the first port has a data rate of a 100 gigabytes per second.

In one embodiment the second network data processor of the system is further to grant the scheduling credit to a separate VOQ for each active port on the first network data processor having a data rate in excess of the threshold and grant scheduling credit to a common VOQ for each port on the first network data processor having a data rate beneath the threshold.

While the foregoing discussion describes exemplary embodiments of the present invention, one skilled in the art will recognize from such discussion, the accompanying drawings, and the claims, that various modifications can be made without departing from the spirit and scope of the invention. Therefore, the illustrations and examples herein should be construed in an illustrative, and not a restrictive sense. The scope and spirit of the invention should be measured solely by reference to the claims that follow.

What is claimed is:

1. A network element comprising:
    a first port to receive a first set of network data, wherein units of the first set of network data belong to a plurality of traffic classes;
    a second port to transmit the first set of network data; and
    a data plane coupled to the first port and the second port, the data plane to forward the units of the first set of network data to the second port via a data pipeline, wherein the data pipeline to buffer the units of the first set of network data in a plurality of traffic class virtual output queues (VOQs) based on at least the traffic class of the unit of network data and each of the plurality of traffic class VOQs corresponds to a different one of the plurality of traffic classes, and wherein the data pipeline is further to:
        buffer a unit of the first set of network data in a traffic class VOQ associated with the first port and the second port when a designated port data rate of the first port is equal to or greater than a port data rate threshold associated with the first port.

2. The network element as in claim 1, further comprising:
    a third port to receive a second set of network data;
    a fourth port to transmit the second set of network data, the data plane to forward the second set of network data to the fourth port via the data pipeline, wherein the data pipeline to buffer the second set of network data in a shared traffic class VOQ that is shared with a fifth port.

3. The network element as in claim 2, wherein the second and fourth ports are the same port.

4. The network element as in claim 1, wherein the data plane comprises a first forwarding engine coupled to the first port, the first forwarding engine including an ingress data pipeline to manage network data received from the first port.

5. The network element as in claim 4, wherein the ingress data pipeline is to:
    for each unit of network data in the first set of network data,
        determine that this unit of network data is to be forwarded to the second port via a network layer address of the network data,
        determine a port identifier associated with the second port, and
        insert the unit of network data into the corresponding traffic class VOQ defined at least in part by the first port, the port identifier associated with the second port, and the traffic class of the unit of network data.

6. The network element as in claim 4, wherein the data plane further comprises a second forwarding engine coupled to the second port, the second forwarding engine including an egress data pipeline to manage network data transmitted to the second port.

7. The network element as in claim 6, wherein the ingress data pipeline of the first forwarding engine is to request a scheduling credit for one of the units of first set of network data, the scheduling credit requested from the egress data pipeline of the second forwarding engine.

8. The network element as in claim 7, wherein the egress data pipeline of the second forwarding engine is to grant the scheduling credit for the one of the units of the first set of network data based on a round robin scheduler.

9. The network element as in claim 8, wherein the round robin scheduler is configured to schedule among different traffic classes of network data.

10. The network element as in claim 8, wherein the round robin scheduler is a weighted round robin scheduler.

11. The network element as in claim 7, wherein the ingress data pipeline is to forward the one of the units of first set of network data to the egress data pipeline after the scheduling credit is granted by the egress data pipeline.

12. A non-transitory machine-readable medium storing instructions which, when executed by one or more processing units of a network element, cause the one or more processing units to perform operations to forward a first set of network data, the operations comprising:
    receiving the first set of network data at a first ingress port of the network element, wherein units of the first set of network data belong to a plurality of traffic classes;
    determining an egress port for the first set of network data via a network layer data header; and
    buffering the units of the first set of network data in a plurality of traffic class virtual output queue (VOQ) associated with each of the first ingress port and the egress port, wherein the traffic class VOQ is determined at least in part based on the egress port and the first ingress port and each of the plurality of traffic class VOQs is associated with a different one of the plurality of traffic classes, and wherein the data pipeline is further to:
        buffer a unit of the first set of network data in a traffic class VOQ associated with the first port and the second port when a designated port data rate of the first port is equal to or greater than a port data rate threshold associated with the first port.

13. The non-transitory machine-readable medium as in claim 12, further comprising:
    receiving a second set of network data at a second ingress port; and
    buffering the second set of network data in a shared traffic class VOQ that is shared with a third ingress port.

14. The non-transitory machine-readable medium as in claim 12, further comprising:
    requesting a scheduling credit for one of the units of first set of network data, the scheduling credit requested from an egress data pipeline of the network element.

15. The non-transitory machine-readable medium as in claim 14, further comprising:
    granting the scheduling credit for the one of the units of the first set of network data based on a round robin scheduler.

16. The non-transitory machine-readable medium as in claim 15, wherein the round robin scheduler is configured to schedule among different traffic classes of network data.

17. A system within a network element to forward network data, the system comprising:
- a first network data processor coupled to a first network interface, the first network data processor to forward network data received from the first network interface, the first network data processor further to:
- receive a set of network data from a first port at the first network interface, wherein units of the set of network data belong to a plurality of traffic classes;
- determine a second port to forward the units of the set of network data based on a network layer address of the units of the set of network data;
- buffer the units of the set of network data in a plurality of traffic class virtual output queues (VOQs) associated with each of the first ingress port and the egress port, wherein a traffic class VOQ for a unit of the set of network data is determined at least in part based on the first and second ports and each of the plurality of traffic class VOQs is associated with a different one of the plurality of traffic classes, and wherein the data pipeline is further to:
- buffer a unit of the first set of network data in a traffic class VOQ associated with the first port and the second port when a designated port data rate of the first port is equal to or greater than a port data rate threshold associated with the first port.

18. The system as in claim 17, further comprising a second network data processor coupled to a second network interface, the second network interface including the second port, wherein the second network data processor is to:
- receive a request for a scheduling credit from the first network data processor; and
- determine whether to grant the scheduling credit based on at least one of a status of an egress buffer associated with the second port and a weighted round robin scheduler.

* * * * *